United States Patent [19]

Lux et al.

[11] Patent Number: 5,664,800
[45] Date of Patent: Sep. 9, 1997

[54] RETENTION SYSTEM FOR ATTACHMENT OF A CONNECTOR TO AN AIR BAG REACTION CANISTER

[75] Inventors: Andreas M. Lux, Korb, Germany; Michael J. Daines, Brigham, Utah; Rick L. Halford, Layton, Utah; Bret N. Broadhead, North Ogden, Utah

[73] Assignee: Morton International, Inc., Chicago, Ill.

[21] Appl. No.: 498,100

[22] Filed: Jul. 5, 1995

[51] Int. Cl.⁶ .................................................. B60R 21/16
[52] U.S. Cl. ........................ 280/728.2; 280/732; 248/74.2
[58] Field of Search ................................. 280/728.2, 732, 280/731; 24/336; 248/74.2, 73, 71, 74.3

[56] References Cited

U.S. PATENT DOCUMENTS

| | | | |
|---|---|---|---|
| 3,228,640 | 1/1966 | Wolsh | 248/74.2 |
| 3,521,332 | 7/1970 | Kramer | 248/74.2 |
| 3,778,537 | 12/1973 | Miller | 248/74.2 |
| 3,807,675 | 4/1974 | Seckerson et al. | 248/73 |
| 5,014,939 | 5/1991 | Kraus et al. | 248/74.2 |
| 5,152,549 | 10/1992 | Aird | 280/728 |
| 5,234,227 | 8/1993 | Webber | 280/728 |
| 5,342,082 | 8/1994 | Kriska et al. | 280/728 |

FOREIGN PATENT DOCUMENTS 4419025  12/1994  Germany .

Primary Examiner—Paul N. Dickson
Attorney, Agent, or Firm—Corinne R. Gorski; Gerald K. White

[57] ABSTRACT

A retention system for securing an electrical accessory, such as an electrical connector, to a reaction canister of an inflatable restraint assembly. The reaction canister comprises a trough-shaped body extruded from a continuous length of material and includes at least one screw retaining groove formed integrally with the body during the extrusion thereof. A retention clip includes a pair of legs interconnected by a bridge. Each of the legs has opposed ends. One of the ends of each of the legs mates with the screw retaining groove to attach the clip to the reaction canister. The other end of each of the legs form a cavity for receiving the electrical connector and securing the same to the reaction canister. In another embodiment, the retention clip mates with an attachment feature, separate from the screw retaining groove, and which is also formed integrally with the body during extrusion.

13 Claims, 6 Drawing Sheets

1

RETENTION SYSTEM FOR ATTACHMENT OF A CONNECTOR TO AN AIR BAG REACTION CANISTER

BACKGROUND OF THE INVENTION

1. Field of the Invention

The present invention relates to a retention system which uses a clip and an existing feature of a reaction canister of an inflatable restraint assembly for securing an electrical accessory, and more particularly to a retainer clip which is attached to a screw retaining groove of the reaction canister for securing a car side electrical connector.

2. Description of the Related Art

It is known in the prior art to employ an inflatable occupant restraint system for protecting a passenger of an automobile. Such restraint system encompass a reaction canister which houses a gas generator or inflator, and an air bag in an uninflated condition. In response to a collision, the gas generator generates gas to inflate and expand the air bag to protect the vehicle occupant. For actuating the gas generator or inflator, an inflator ignitor or squib, which comprises an electro-explosive device, starts the material of the gas generator burning. The inflator initiator is connected to a collision sensor that is positioned adjacent the initiator or at a remote location in the vehicle.

The initiator or squib is electrically interconnected to the main wiring assembly of the vehicle via a module connector. Normally, the module connector and lead wires extending between the initiator and module connector are held in place. Several methods have been used to restrain wires, such as wire ties, snap in clips, etc., which requires holes drilled in the reaction canister. One disadvantage with drilling holes in the reaction canister is that the canister then acts as a "pressure can" resulting in the clips being blown out.

SUMMARY OF THE INVENTION

It is an object of the present invention to provide a connector retention system which overcomes the deficiencies of the prior art by providing a means for attaching and securing to the reaction canister of an inflatable restraint system an electrical accessory, such as a car side electrical connector, while incorporating an existing feature of the reaction canister, which enables a reduction in the manufacturing cost.

Another object of the invention is to provide a retention clip which uses an existing screw retaining groove of the reaction canister to secure a connector thereto, thus avoiding costly machining to the reaction canister or end plates. No holes are needed in the reaction canister to attach the clip. By using the screw retaining groove already present in the reaction canister the extrusion of the canister does not need to be changed. Furthermore, manual assembly is also possible.

Still another object of the invention is to provide a retention system which does not require secondary, costly operations normally associated with machining a part, such as drilling holes in the reaction canister to accommodate a more traditional fastening scheme.

A feature additional to the screw retaining groove can be used to secure the retention clip on the reaction canister. The attachment feature can also be formed integrally with the canister during extrusion thereof. The additional material used to form the attachment feature is still cheaper than using a secondary operation, such as punching a hole in the can or adding a weld bolt.

The present invention achieves the foregoing objectives by providing a retention system for securing an accessory to a reaction canister of an inflatable restraint assembly. A retention clip has one end which is capable of receiving a coupling of the accessory. Attachment means formed integrally with the reaction canister mate with the other end of the retention clip. The reaction canister comprises a trough-shaped body extruded from a continuous length of material. The attachment means can comprise at least one screw retaining groove or an additional attachment feature formed integrally with the body during the extrusion thereof.

The retention clip includes a pair of legs interconnected by a bridge. Each of the legs has opposed ends. One of the ends of each of the legs mates with the screw retaining groove or attachment feature to attach the clip to the reaction canister. The other end of each of the legs receives the accessory and securing the same to the reaction canister.

Other features and advantages of the present invention will become apparent from the following description of the invention which refers to the accompanying drawings.

DESCRIPTION OF THE PREFERRED EMBODIMENTS

Figure 1:
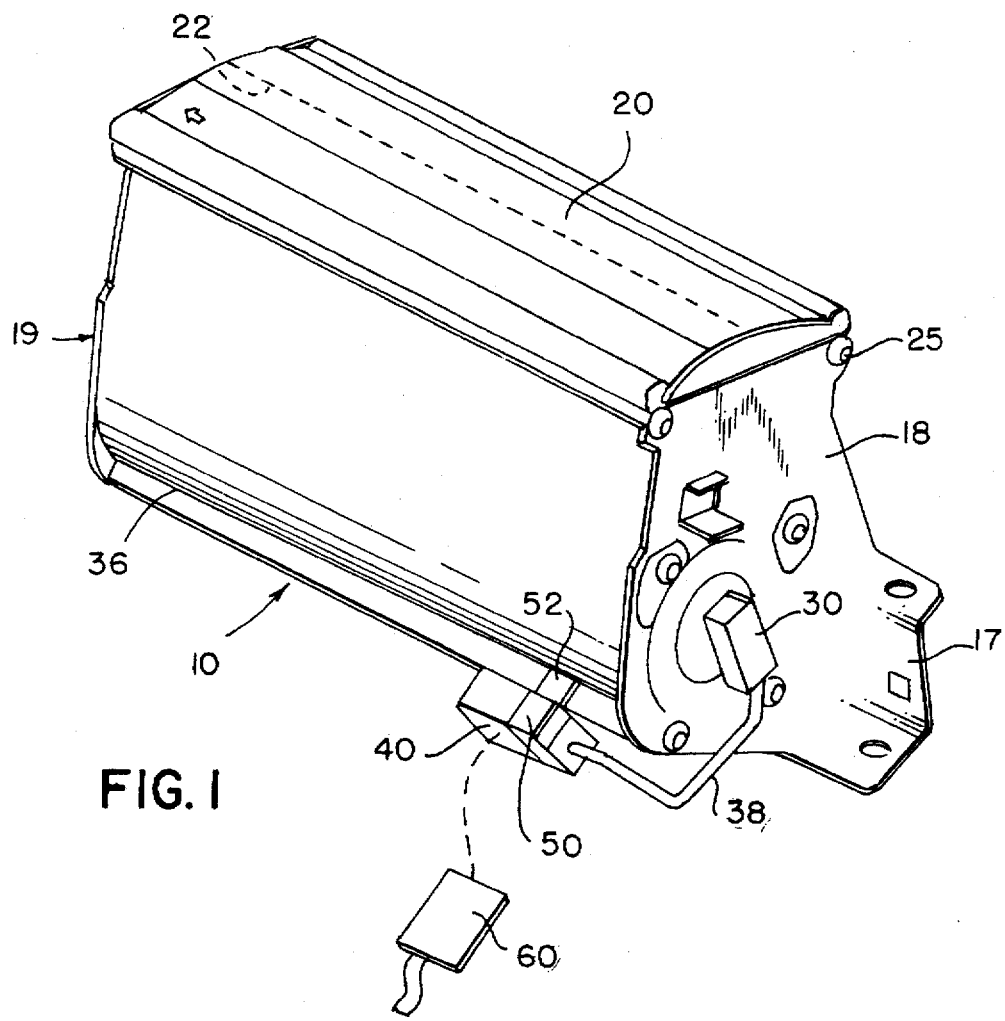
FIG. 1 is a perspective view of a reaction canister and retention clip for securing a car side connector coupling according to the present invention.
Figure 2:
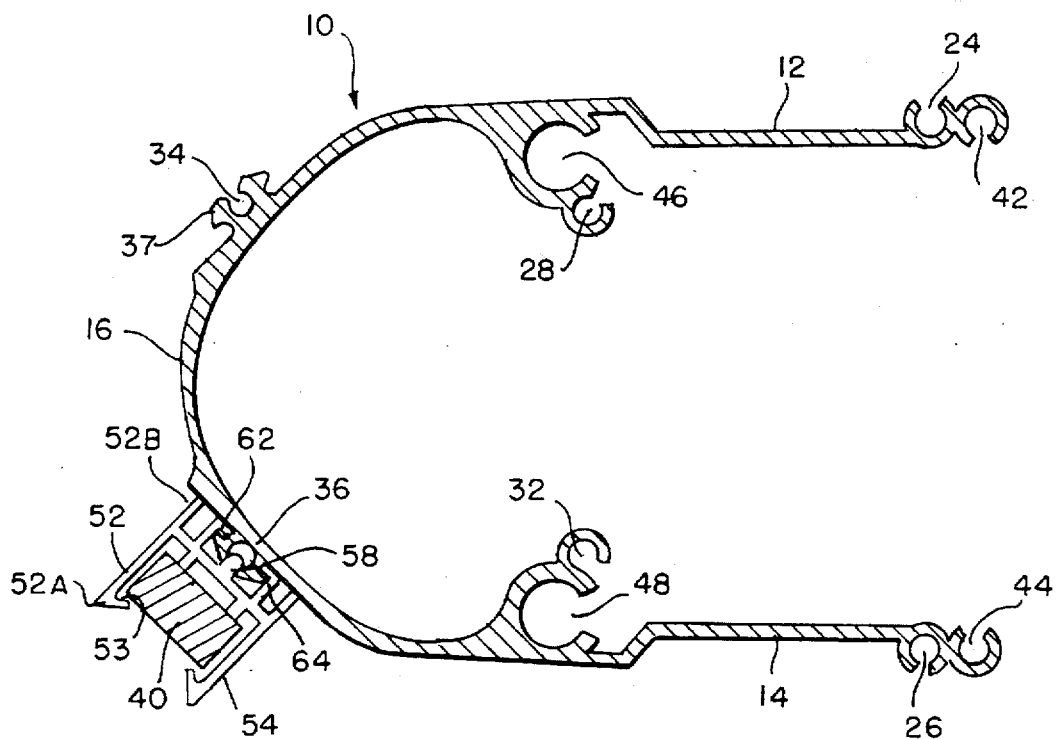
FIG. 2 is a cross-section illustrating the engagement of the retention clip on the reaction canister.

Referring to FIGS. 1 and 2, a reaction canister 10 houses a gas generator and inflatable air bag (not shown) of a passive restraint system. Reaction canister 10 has a trough-shaped body 11 including opposed sidewalls 12 and 14 and a rounded bottom wall 16 joining the sidewalls. The body of the canister is extruded from a continuous length of material, in particular aluminum, and then cut into various lengths to accommodate a variety of generator sizes. Extrusion of the canister body allows for the integral formation of various features, such as retaining screw grooves 24, 26, 28, 32, 34 and 36 (FIG. 2), for attaching two end plates 18, 19, which will be described further herein.

As shown in FIG. 1, the reaction canister body 10 is enclosed on both sides by end plates 18, 19. End plates 18, 19 can be stamped from sheet metal, for example steel. End plates 18, 19 retain the shape of the canister body, hold the gas generator in place and provide means for attaching the canister within an instrument panel (not shown). It should be understood that the invention has applicability to both passenger side and driver side module assemblies.

For mounting the reaction canister in a vehicle, each of the end plates 18, 19 include an attachment flange 17, one of the flanges 17 being shown in FIG. 1.

Figure 3:
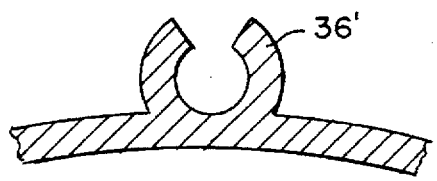
FIG. 3 is an enlarged view of a typical reaction can screw retaining slot.

As previously mentioned, the reaction canister 10 includes a plurality of screw retaining grooves 24, 26, 28, 32, 34 and 36 for attaching the end plates thereto. Retaining screw grooves 34 and 36 are located on an exterior surface of rounded bottom wall 16 A typical screw retaining groove 36' is shown in FIG. 3.

Figure 4:
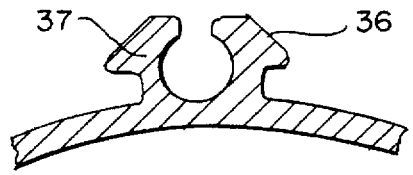
FIG. 4 is an enlarged view of the screw retaining groove having notched arms.

Each of the retaining grooves 34, 36, shown in FIGS. 2 and 4, include a pair of outwardly extending notched arms 37, which will be described further herein.

Reaction canister body 10 also includes two grooves 42, 44 for connecting a cover 20 on the reaction canister, as shown in FIG. 1. Cover 20 is provided with an upper wall that is frangible along a tear seam 22 through which an inflated air bag is deployed, as is well known in the art.

Reaction canister 10 also includes a pair of internal integral channels 46, 48 formed during extrusion. Channels 46, 48 can receive and hold a portion of an inflatable air bag (not shown) or tether straps of an air bag (not shown), as is well known in the art.

As previously discussed, the reaction canister 10 is extruded with the screw retaining grooves, for example retaining groove 36, as shown in FIG. 1, extending along the entire length of the canister body. During assembly of the restraint system, the air bag and gas generator are loaded in the canister, and the end plates are secured to the body part by fasteners, such as screws 25. At least one of the end plates 18, 19 is configured to allow an inflator initiator or squib 30 to extend therethrough. Inflator initiator 30 communicates with a gas generator or inflator housed within canister 10. The initiator or squib is an electro-explosive device which receives an electrical signal from a crash sensor (not shown) and starts the gas generant material of the inflator burning to deploy the air bag.

Lead wires 38 extend from initiator 30 to a module connector 40. Module connector 40 is a female connector which receives a male car side connector 60. The connector 60 is a device that electrically interconnects the main wiring assembly of the vehicle to the inflator assembly's associated hardware.

A retention clip 50 is provided to engage the screw retaining groove 36 at one end and support module connector 40 at the other end, as shown in FIG. 2.

Figure 5:
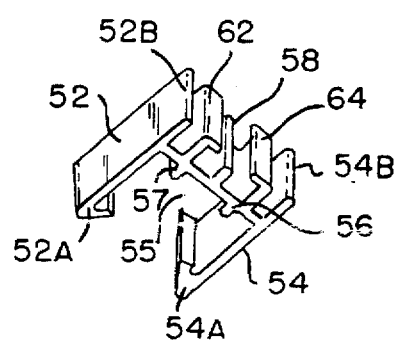
FIG. 5 is a perspective view of the retention clip, according to the present invention.

As shown in FIGS. 2 and 5, retention clip 50 includes two legs 52 and 54 joined by a bridge 56. Each of the legs 52, 54 has opposed ends 52A,B and 54A,B, respectively. A cavity 55 is formed by leg ends 52A, 54A and bridge 56.

When assembled on canister 10, leg ends 52B and 54B rest against the exterior surface of wall 16 of canister 10. Ridges 57 extending from bridge 56 into cavity 55 abut connector 40 when it is held in the clip. Legs 52, 54 are resilient such that ends 52A and 54A can be flexed to receive module connector 40. Each of the ends 52A, 54A also include a notch 53 for retaining the module connector 40 in cavity 55.

Interior of legs 52, 54 and extending upwardly from bridge 56 are a pair of notched lips 62, 64. Lips 62, 64 engage arms 37 of the screw retaining groove 36 to lock together therewith. A projection 58 extends into groove 36 to further stabilize the connection between clip 50 and screw retaining groove 36.

Figure 6:
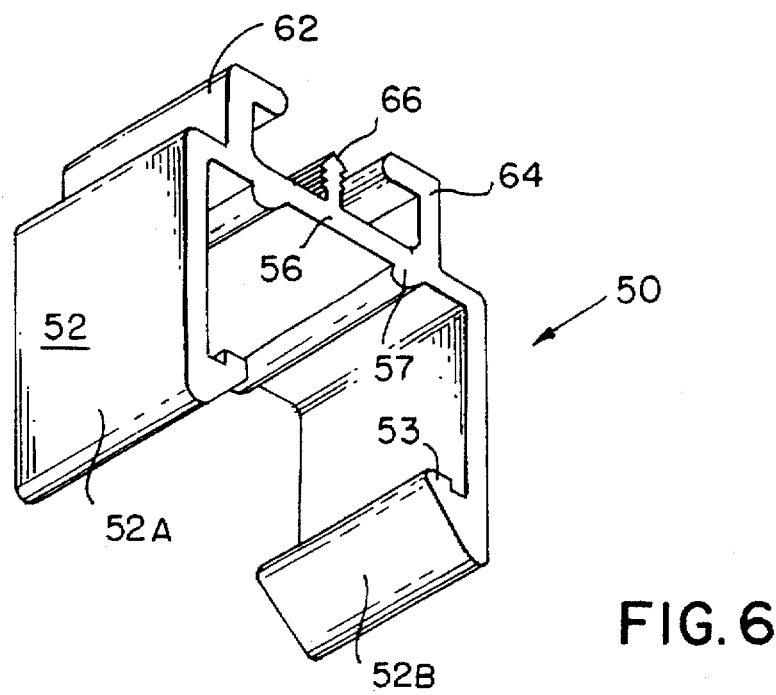
FIG. 6 is a perspective view of another embodiment of the retention clip.
Figure 7:
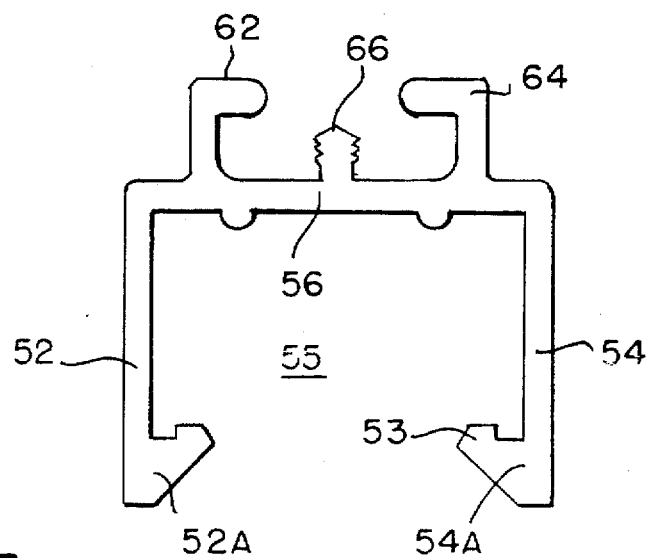
FIG. 7 is a side view of the clip of FIG. 5.

A second embodiment of retention clip 50 is shown in FIGS. 6 and 7. Wherever, possible, like numerals have been used to illustrate the same parts in each of the embodiments. As in the first embodiment, the clip 50 includes two legs 52, 54 joined by a bridge 56. Lips 62, 64 extend upwardly from bridge 56 and engage the arms 36 of the screw retaining groove (FIG. 2). A ridged projection 66 also extends from bridge 56 to stabilize the connection between the clip and canister.

Figure 8:
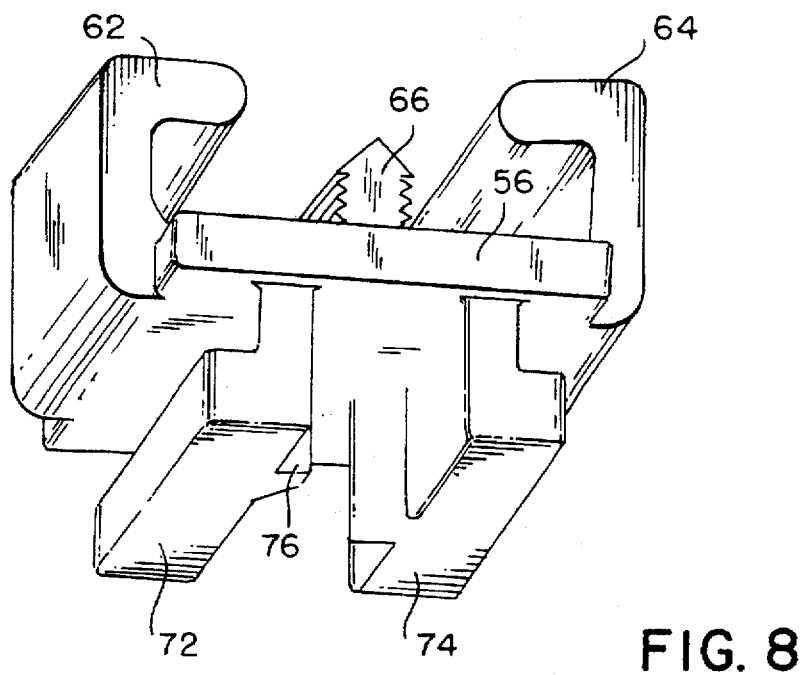
FIG. 8 is a perspective view of a third embodiment of the retention clip of the present invention.
Figure 9:
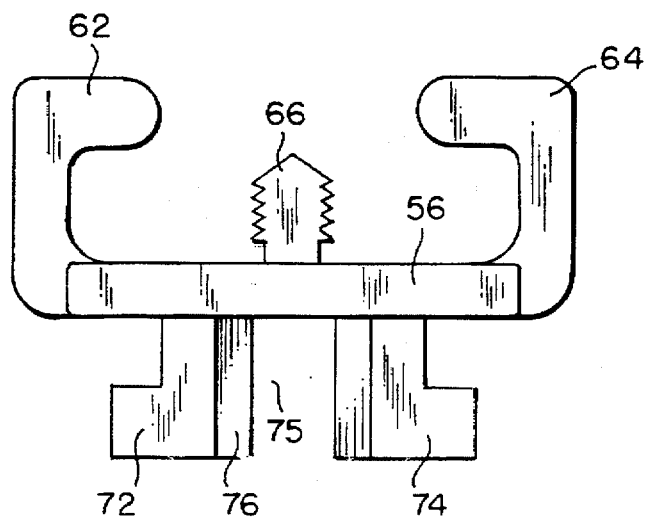
FIG. 9 is a side view of the clip of FIG. 8.
Figure 10:
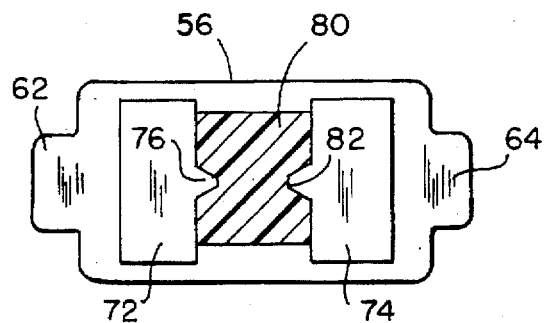
FIG. 10 is a bottom view of the clip of FIG. 8 securing a connector coupling.

A third embodiment of the retention clip is illustrated in FIGS. 8–10. The clip includes lips 62 and 64, extending upwardly from bridge 56, for engaging the screw retaining groove of the canister, as previously described. Extending downwardly from bridge 56 are a pair of L-shaped legs 72, 74 forming a cavity 75 therebetween. Each of legs 72, 74 include a projection 76 along its entire length. Projections 76 extend into cavity 75.

As shown in FIG. 10, the clip engages and holds a module connector 80. Connector 80 includes a recess 82 in the middle thereof on each side. Projections 76 extend into recess 82 to secure the connector within the clip.

Retainer clip 50 can be formed as a dual durometer extrusion, cut into discrete lengths, or formed as an injection molded part. The dual durometer extrusion allows for the clip to be made of a material having different hardnesses. Therefore, legs 52, 54 and 72, 74 can be extruded from a more resilient material to allow for the expansion of the legs when inserting the module connector. Legs 52,54 and 72,74 can take any form depending on the shape and characteristics of the actual connector used.

Figure 11:
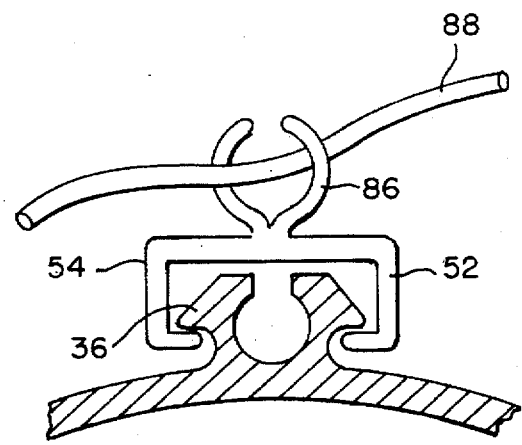
FIG. 11 is another embodiment of the retention clip of the present invention.

Clip 50 can be manufactured from a number of materials, for example, nylon 6/6 or ABS. Moreover, the legs 52, 54 of the clip can be made of a different high friction material than the rest of the clip to improve its retention forces. A clip of a material having different friction coefficiencies is possible to manufacture by both extrusion and injection molding. As shown in FIG. 11, a conventional wire-tie 86 can also be used with the clip 50. Tie 86 can hold a wire or tube 88. It should be appreciated that the clip can also be used to secure a fuel line or speedometer cable, for example, depending on the automaker's requirement.

Figure 12:
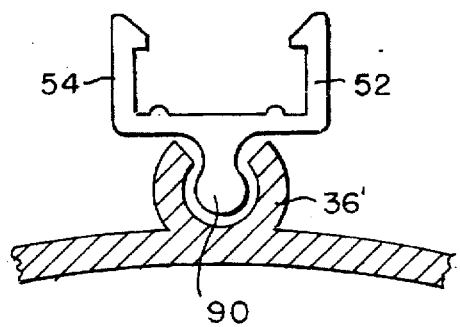
FIG. 12 is a fifth embodiment of the retention clip of the present invention.

FIG. 12 illustrates still another embodiment wherein the clip includes a single leg 90 which is held by the arms of the conventional screw retaining groove 36'.

Figure 13:
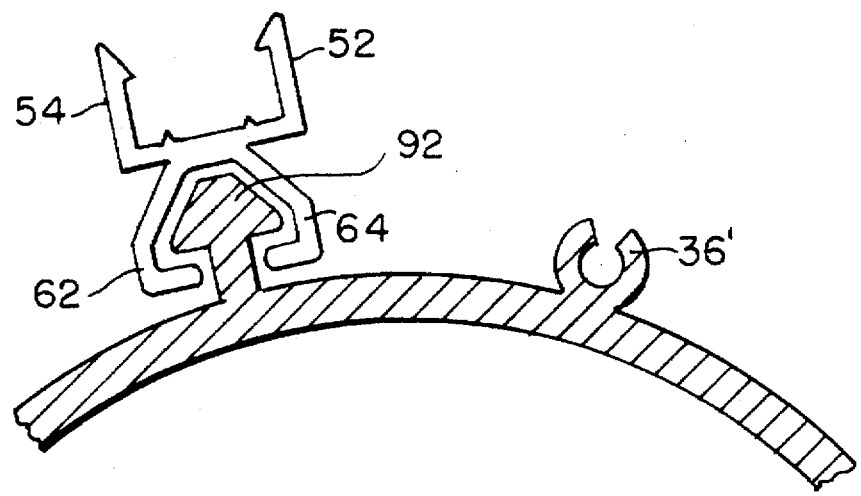
FIG. 13 is an embodiment of the present invention illustrating an additional attachment feature of the reaction canister.
Figure 14:
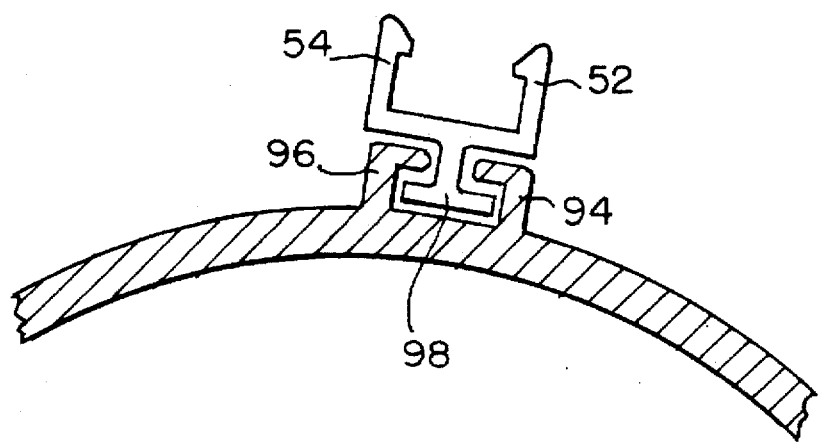
FIG. 14 is another embodiment of an additional attachment feature.

FIGS. 13 and 14 illustrate embodiments of the invention wherein an additional attachment feature is used to secure the clip to the canister. The attachment features can also be formed during the extrusion of the canister, and can extend along an entire length thereof. In FIG. 13, the attachment feature comprises a projection 92 extending from the canister. Although, shown as an arrow-shape, the attachment feature can take any shape as desired. The lips 62, 64 of the clip can also be configured to mate with the shape of the attachment feature. In FIG. 14, the attachment feature is shown as a pair of outwardly extending arms 94, 96 which grasp a T-shaped projection 98 of the clip.

Next the assembly of the connector and clip to the reaction canister will be described. During assembly, the inflator and gas generator are secured within the body of reaction canister 10. Retainer clip 50 can either be slid on screw retainer groove 34,36 from one end of canister 10 prior to attaching one of the end plates 18, 19, or snapped in place over arms 37 of the groove 36. For example, the end plates 18, 19 can then be secured to the canister body using the plurality of screw grooves 24, 26, 28, 32, 34 and 36 and fasteners 25. Cover 20 can then be attached to the canister body. Once the inflator assemble is completed, module connector 40 can be slid or snapped into cavity 55 of clip 50 and car side connector 60 attached thereto. It should be appreciated that any order of assembly is contemplated, with the actual assembly method depending upon the actual manufacturing assembly line.

Although the present invention has been described in relation to particular embodiments thereof; many other variations and modifications and other uses will become apparent to those skilled in the art. It is preferred, therefore, that the present invention be limited not by the specific disclosure herein, but only by the appended claims.

What is claimed is:

1. A retention system securing an accessory to a reaction canister of an inflatable restraint assembly, the reaction canister having attachment means formed integrally therewith, comprising:

a retention clip having opposed ends, one of said ends of said clip being capable of receiving a coupling of the accessory; and said attachment means mating with the other end of said retention clip, the reaction canister including a trough-shaped body extruded from a continuous length of material and the attachment means comprises at least one screw retaining groove formed integrally with the body during the extrusion thereof, wherein said at least one screw retaining groove includes a pair of notched arms extending from an exterior surface of said reaction canister body.

2. The retention system of claim 1, wherein said clip includes a leg which is engaged by the notched arms of said screw retaining grooves to secure said clip on said groove.

3. The retention system of claim 3, wherein said clip includes a pair of legs interconnected by a bridge, each of said legs having opposed ends.

4. The retention system of claim 3, wherein one end of each of said pair of clip legs engage the notched arms of said screw retaining grooves to secure said clip on said groove.

5. The retention system of claim 4, wherein the other end of each of said pairs of legs of said clip form a cavity therebetween for receiving the accessory.

6. The retention system of claim 4, wherein said retention clip includes a projection extending upwardly from said bridge, wherein when said clip is secured on said reaction canister said projection extends into said screw retaining groove.

7. A retention system securing an electrical accessory to a reaction canister of an inflatable restraint assembly, the reaction canister having attachment means formed integrally therewith, comprising:

a retention clip having opposed ends, one of the ends of the clip mating with the attachment means and the other end being capable of receiving a coupling of the electrical accessory, the reaction canister having a trough-shaped body extruded from a continuous length of material, the attachment means comprising at least one screw retaining groove formed integrally with the body during the extrusion thereof, the at least one screw retaining groove including a pair of notched arms extending from an exterior surface of the reaction canister body; and said retention clip including a pair of legs interconnected by a bridge, each of said legs having opposed ends, one end of each of said pair of legs engaging said notched arms of said screw retaining groove to secure said clip on said groove, and said retention clip including a projection extending upwardly from the bridge, wherein when said clip is secured on the reaction canister said projection extends into said screw retaining groove, wherein said projection is barbed to secure said projection within said screw retaining groove.

8. The retention system of claim 1 wherein the one end of said clip comprises a wire tie for securing the accessory, and the other end of said clip comprises a pair of legs which engage the arms of the screw retaining groove.

9. The retention system of claim 1, wherein the accessory is an electrical connector of a vehicle in which the inflatable restraint assembly is mounted.

10. A method of securing an accessory to a reaction canister of an inflatable restraint assembly, said reaction canister having opposed ends and including attachment means formed integrally therewith, the method of securing comprising the steps of:

attaching a retention clip to said attachment means of said reaction canister, said retention clip having a first and second end, said first end of said clip mating with said attachment means and said second end of said clip being capable of receiving the accessory, wherein said reaction canister comprises a trough-shaped body extruded from a continuous length of material and said attachment means comprises at least one screw retaining groove formed integrally with said body during the extrusion thereof, said at least one screw retaining groove including a pair if notched arms extending from an exterior surface of said reaction canister body, said step of attaching comprising attaching said first end of said clip to said screw retaining groove; and securing the accessory to the second end of said clip.

11. The method of claim 10 wherein said step of attaching said clip comprises snapping said one end of said clip onto said notched arms.

12. The method of claim 10, wherein the reaction canister includes a pair of endplates securable on the ends thereof, and said step of attaching said clip comprises sliding said first end of said clip over said notched arms prior to securing said end plates on said reaction canister body.

13. A reaction canister of an inflatable restraint assembly and a retention system for securing an electrical accessory to the reaction canister, comprising:

means formed integrally with said reaction canister for attaching an end plate to each end of said reaction canister, said reaction canister having a trough-shaped body extruded from a continuous length of material, attachment means comprising at least one screw retaining groove formed integrally with said body during the extrusion thereof, said at least one screw retaining groove including a pair of notched arms extending from an exterior surface of said reaction canister body; and a retention clip having opposed ends, one of said ends of said clip mating with said attachment means and said other end being capable of receiving the electrical accessory, said clip including a pair of legs interconnected by a bridge, each of said legs having opposed ends, one end of each of said pair of clip legs engaging the notched arms of said screw retaining groove to secure said clip on said groove, and the other end of each of said pairs of legs of said clip forming a cavity therebetween for receiving the electrical accessory, said retention clip including a projection extending upwardly from said bridge, wherein when said clip is secured on said reaction canister said projection extends into said screw retaining groove.

* * * * *

UNITED STATES PATENT AND TRADEMARK OFFICE
CERTIFICATE OF CORRECTION

PATENT NO. :   5,664,800
DATED      :   September 9, 1997
INVENTOR(S) :  Lux et al.

It is certified that error appears in the above-indentified patent and that said Letters Patent is hereby corrected as shown below:

Col. 5, Line 38,   "claim 3" should read -- claim 1 -- .

Signed and Sealed this

Seventeenth Day of February, 1998

Attest:

BRUCE LEHMAN

*Attesting Officer*          *Commissioner of Patents and Trademarks*